(12) United States Patent
Casas et al.

(10) Patent No.: US 8,724,759 B2
(45) Date of Patent: May 13, 2014

(54) COHERENT SYNCHRONIZATION AND FRAMING IN A DIGITAL TELEVISION RECEIVER

(75) Inventors: Raúl Alejandro Casas, Doylestown, PA (US); Stephen Biracree, Rochester, NY (US); Anand Mahendra Shah, San Francisco, CA (US); Slobodan Simovich, San Francisco, CA (US); Thomas Joseph Endres, Seattle, WA (US)

(73) Assignee: I Berium Communications, Inc., San Francisco, CA (US)

( * ) Notice: Subject to any disclaimer, the term of this patent is extended or adjusted under 35 U.S.C. 154(b) by 17 days.

(21) Appl. No.: 13/465,971

(22) Filed: May 7, 2012

(65) Prior Publication Data

US 2012/0281140 A1 Nov. 8, 2012

Related U.S. Application Data

(60) Provisional application No. 61/483,251, filed on May 6, 2011.

(51) Int. Cl.
*H04L 7/00* (2006.01)

(52) U.S. Cl.
USPC ........... 375/355; 375/260; 375/316; 375/345; 375/348; 375/347; 375/357; 375/362

(58) Field of Classification Search
USPC .......................... 375/260, 316, 345, 348, 347
See application file for complete search history.

(56) References Cited

U.S. PATENT DOCUMENTS

| | | | |
|---|---|---|---|
| 8,441,752 B1 * | 5/2013 | Song et al. | 360/45 |
| 8,483,317 B2 * | 7/2013 | Zhu et al. | 375/316 |
| 2005/0068886 A1 * | 3/2005 | Wang et al. | 370/210 |
| 2006/0120497 A1 * | 6/2006 | Blasco Claret et al. | 375/355 |
| 2008/0101495 A1 * | 5/2008 | Gaikwad | 375/267 |
| 2010/0285766 A1 * | 11/2010 | Okino et al. | 455/226.3 |

* cited by examiner

*Primary Examiner* — Siu Lee
(74) *Attorney, Agent, or Firm* — Olympic Patent Works PLLC

(57) ABSTRACT

The current application is directed to maintaining the correct number of symbols in a protocol frame in a digital communications receiver, to prevent catastrophic failure due to dynamic multipath or cycle slips. Timing recovery and framing are coherent, facilitated by placing channel estimation directly into a larger timing recovery loop.

5 Claims, 8 Drawing Sheets

*DTV receiver system in accordance with present invention*

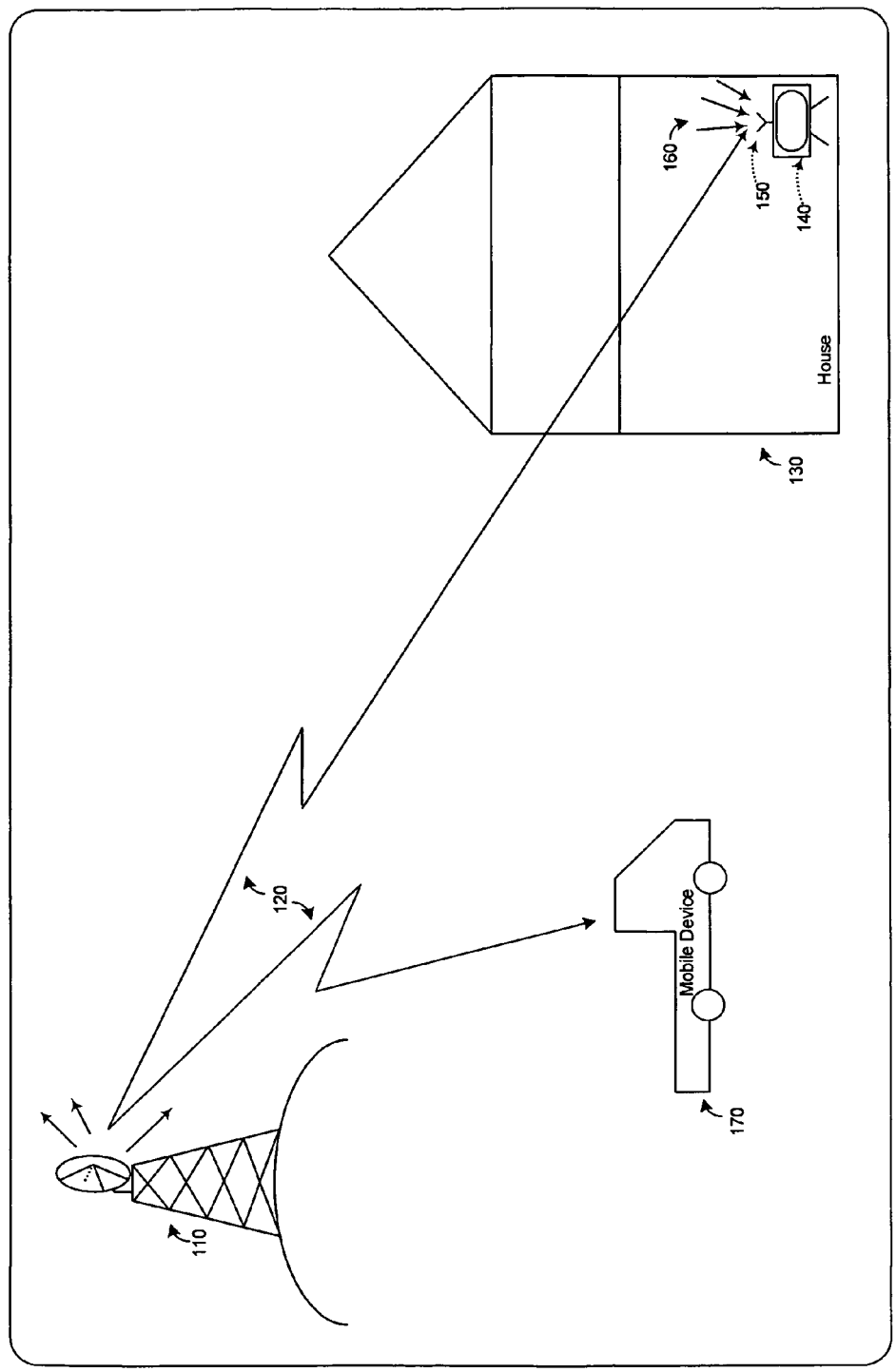
*Figure 1: Typical prior art digital television broadcast system*

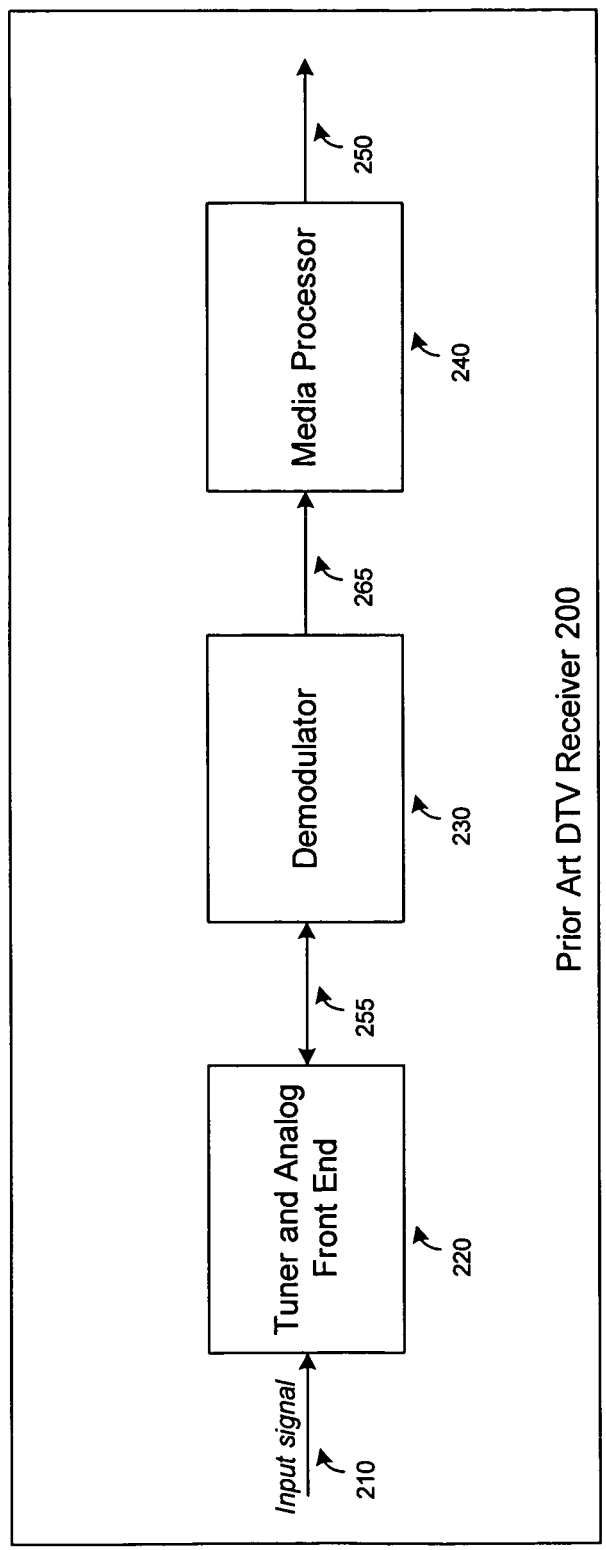
Figure 2: Typical prior art DTV receiver system

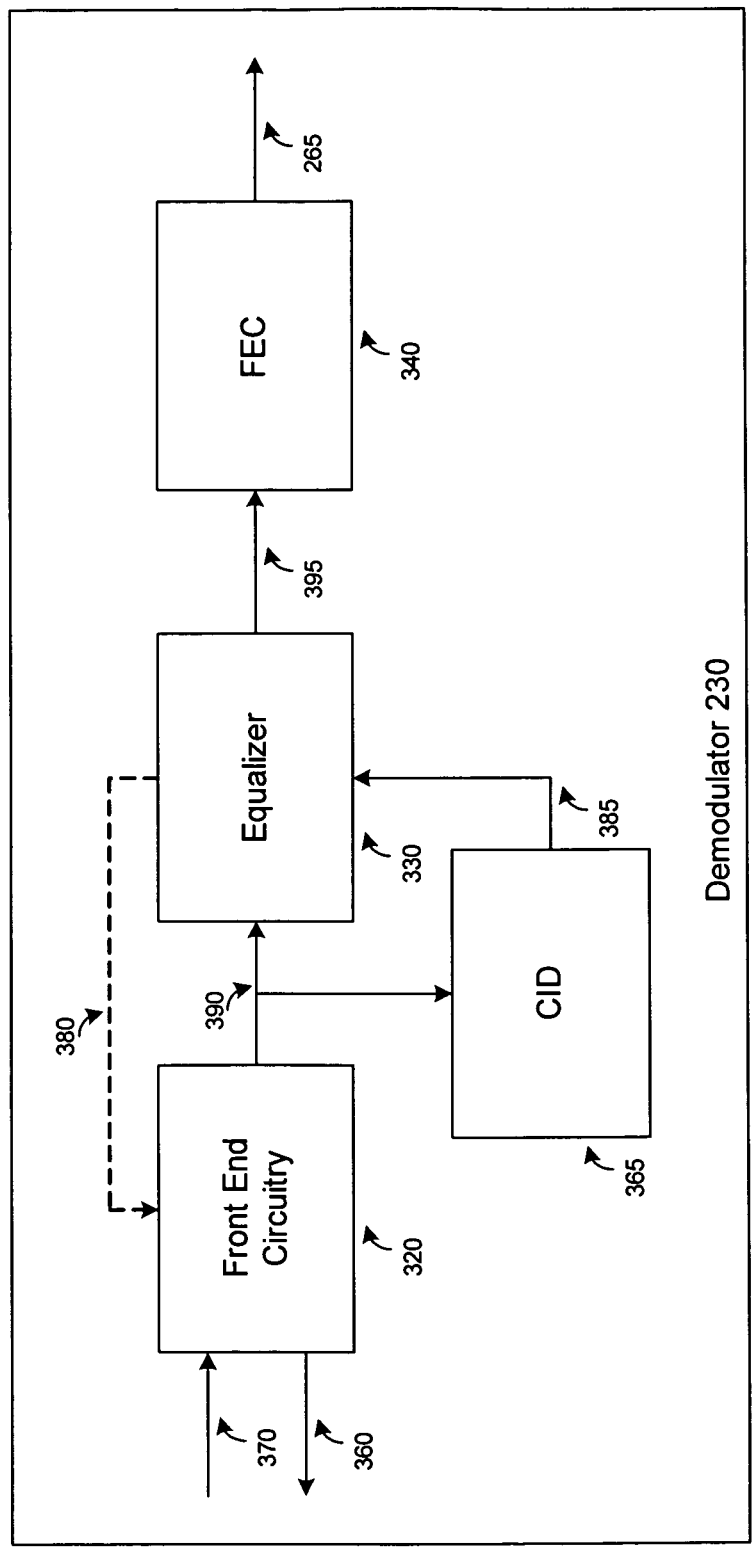
Figure 3: Prior Art DTV receiver system

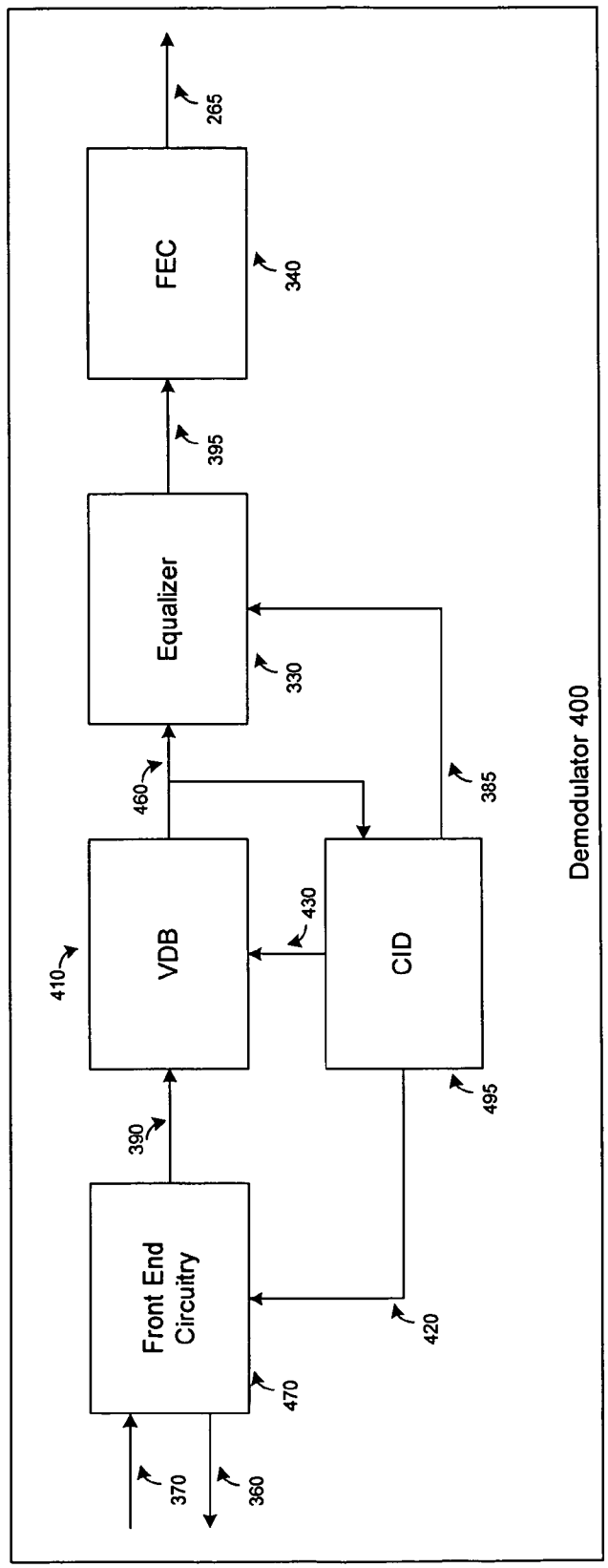
Figure 4: DTV receiver system in accordance with present invention

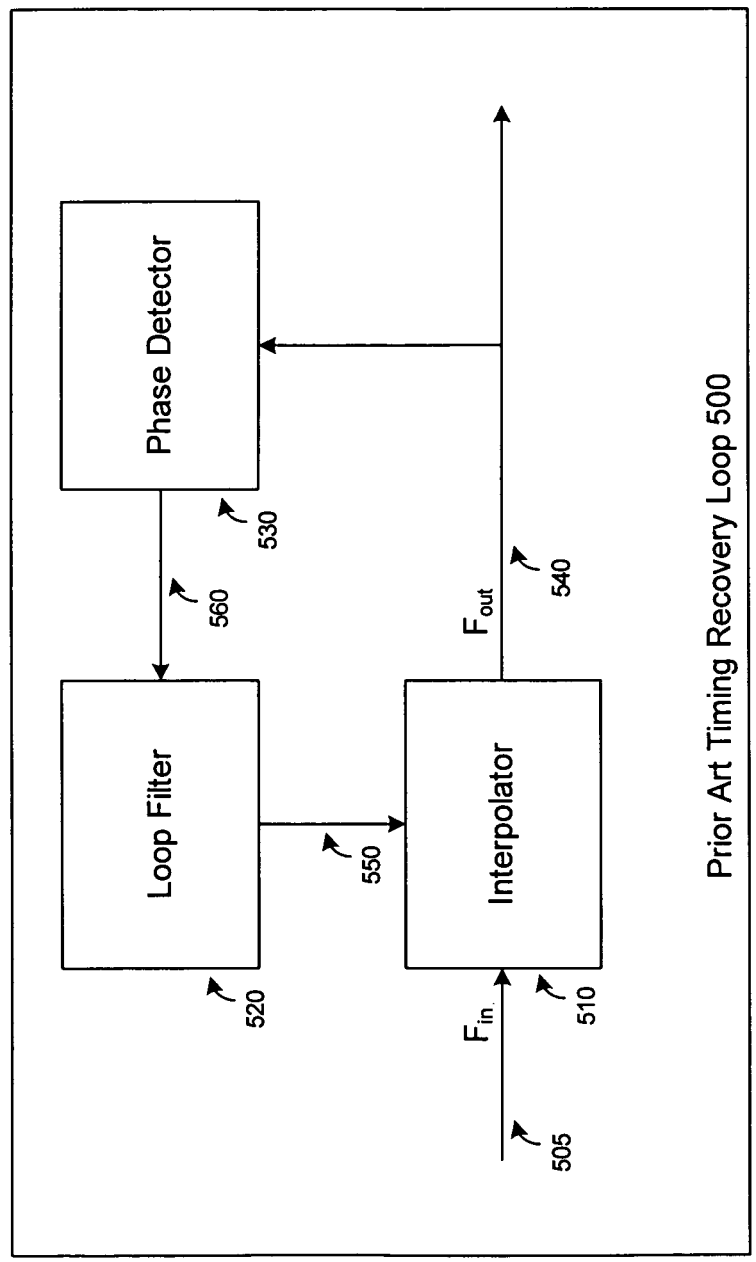
*Figure 5: Prior Art Timing Recovery Loop*

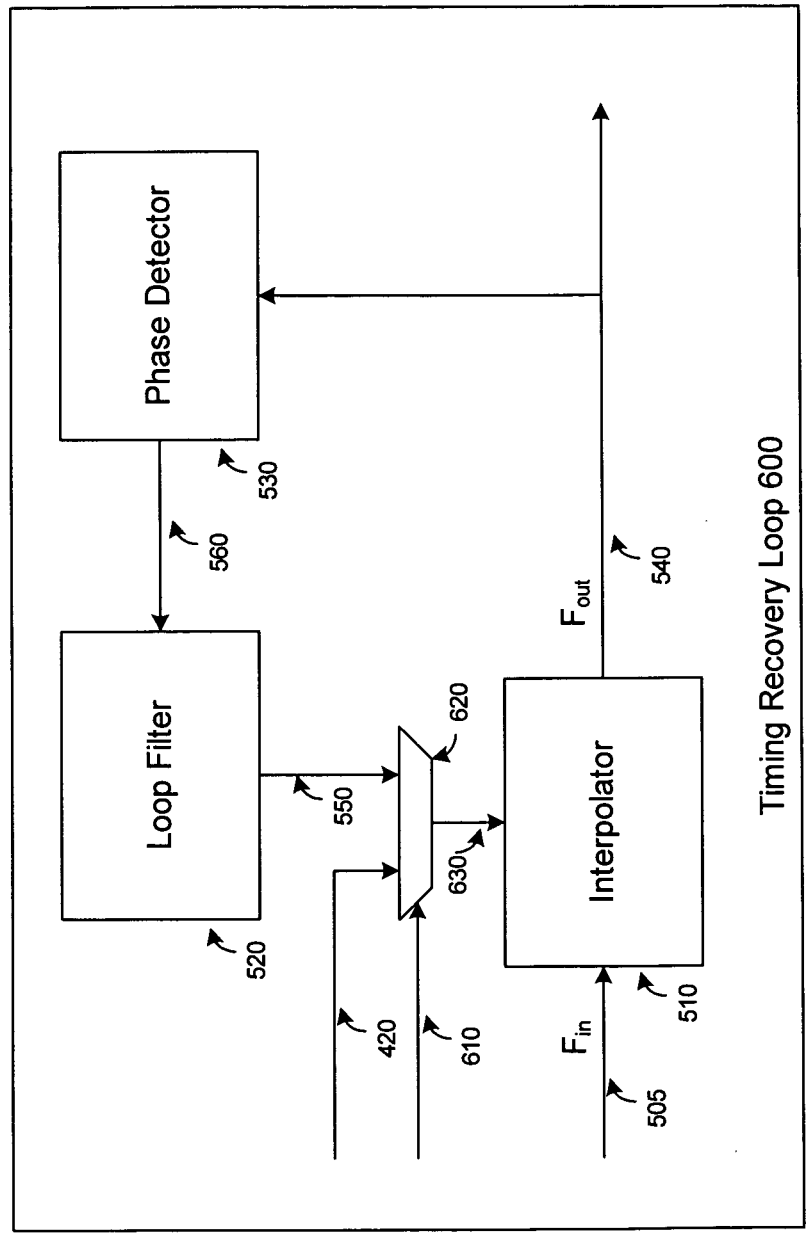
Figure 6: Timing Recovery Loop in accordance with the present invention

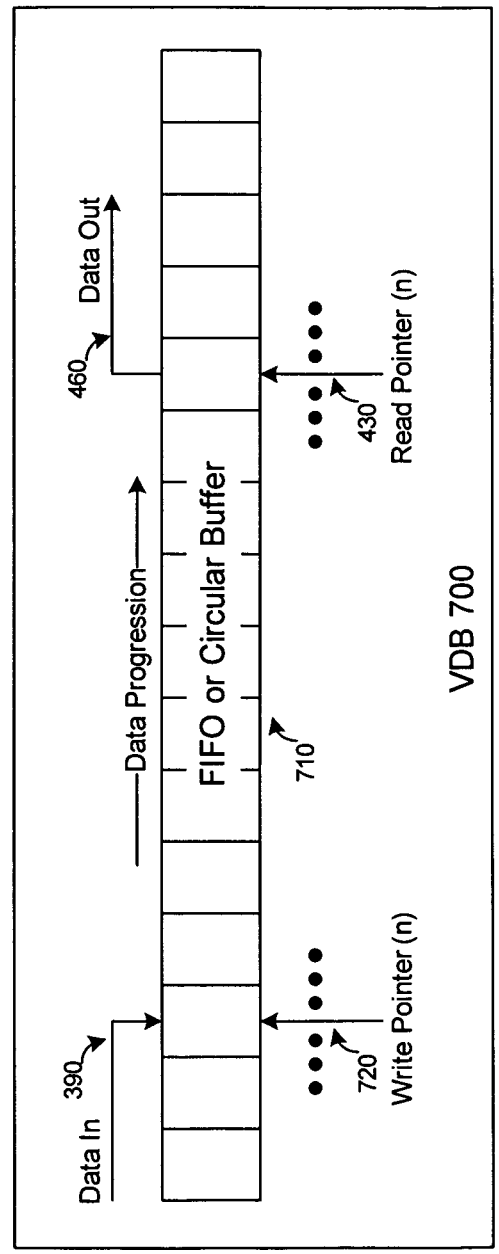
Figure 7: Variable Delay Buffer in accordance with the present invention

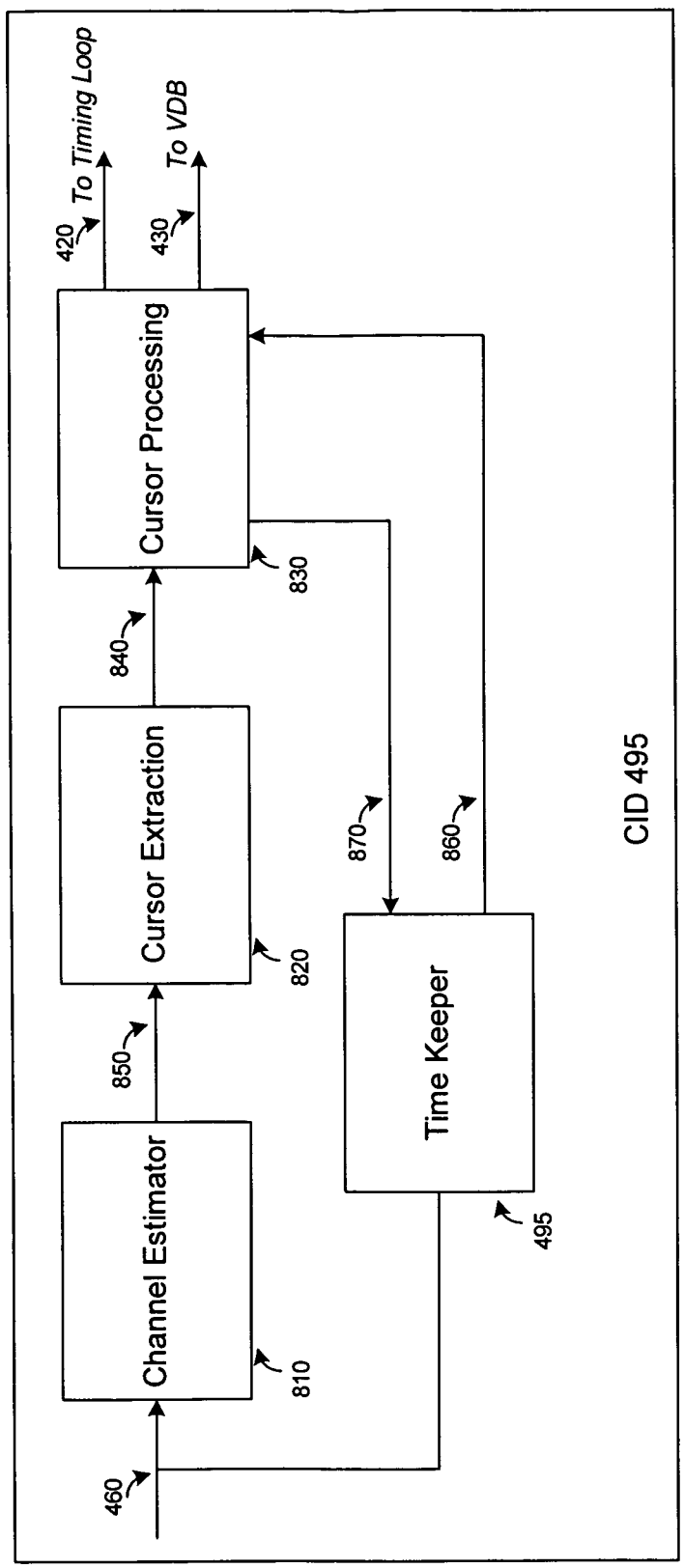
Figure 8: CID in accordance with the present invention

COHERENT SYNCHRONIZATION AND FRAMING IN A DIGITAL TELEVISION RECEIVER

CROSS-REFERENCE TO RELATED APPLICATION

This application claims the benefit of U.S. Provisional Application No. 61/483,251, filed May 6, 2011.

TECHNICAL FIELD

The current application is directed to maintaining the correct number of symbols in a protocol frame in a digital communications receiver, to prevent catastrophic failure due to dynamic multipath or cycle slips. Timing recovery and framing are coherent, facilitated by placing channel estimation directly into a larger timing recovery loop.

BACKGROUND

Modern digital communications systems use sophisticated modulation and coding approaches to combat severe physical-layer distortions and still deliver high-throughput, low error-rate services to consumers. For example, Digital Television (DTV) in the U.S. uses signaling according to the ATSC A/53 Standard, (available in six parts at http://www.atsc.org/cms/index.php/standards/published-standards/) radiating an RF terrestrial broadcast that pushes 19.3 Mbps in a 6 MHz bandwidth through a VHF/UHF channel. Other global DTV standards are similar. This combination of throughput and propagation medium, coupled with increasing demand for services to mobile users, can impart significant dynamic distortions to the radiated broadcast, as witnessed by the consumer device.

Besides relying on advanced equalization strategies to remove the distortions to the received signal, DTV systems apply channel coding to the data prior to RF broadcast, so the DTV receiver necessarily employs a channel decoder to recover the user data—audio and video. This decoder usually uses a nested combination of forward error correction (FEC) techniques to drive the error rate down to imperceptible levels, usually $O(10^{-6})$ BER, including Reed-Solomon and Trellis decoder, or Low Density Parity Check and BCH decoder. Implicit in the implementation of these FEC decoder algorithms is that the number of samples per frame, as defined by the specific protocol, be correct; that is, if the number of samples per frame is not what is expected by the FEC, the result is usually a catastrophic failure with lost, unrecoverable data.

Recent field measurements confirm the existence of RF propagation channels with severe dynamic multipath, so much as to cause cycle slips in timing recovery circuitry, or changes in system data delays, producing framed data to FEC decoders with inconsistent numbers of samples per frame in prior art receiver designs. These prior art receiver designs catastrophically fail in these cases.

SUMMARY

The current application is directed to maintaining the correct number of symbols in a protocol frame in a digital communications receiver, to prevent catastrophic failure due to dynamic multipath or cycle slips. Timing recovery and framing are coherent, facilitated by placing channel estimation directly into a larger timing recovery loop.

BRIEF DESCRIPTION OF DRAWINGS

FIG. 1 shows a typical prior art digital television broadcast communication system;
FIG. 2 shows a typical prior art DTV receiver system.
FIG. 3 shows a prior art DTV receiver system.
FIG. 4 shows a DTV receiver system.
FIG. 5 shows a prior-art timing recovery loop.
FIG. 6 shows a timing recovery loop.
FIG. 7 shows a variable delay buffer.
FIG. 8 shows a channel identification.

DETAILED DESCRIPTION

The current application is directed to maintaining the correct number of symbols in a protocol frame in a digital communications receiver, to prevent catastrophic failure due to dynamic multipath or cycle slips. Timing recovery and framing are coherent, facilitated by placing channel estimation directly into a larger timing recovery loop. Channel estimation circuitry is used to derive a frequency error signal, which drives the re-sampling rate in the timing recovery loop. Data is inserted or removed before FEC framing using a variable delay buffer, and rate of re-sampling in the timing recovery loop is driven by channel estimation circuitry, with both of these processes jointly performed, guaranteeing the correct number of samples per FEC frame.

FIG. 1 depicts a typical prior art digital television broadcast communication system. Transmitter station 110 broadcasts Digital Television (DTV) signal 120, which radiates through house 130 to antenna 150, and to mobile device 170. The induced penetration loss of the RF carrier's signal power through house 130 can be significant, easily 20 dB. Antenna 150 is usually in close proximity to television 140, or can be remotely connected (wired or wireless) to television 140. Antenna 150 also receives multipath signals, collectively 160, which can be caused by reflections from other buildings, or items interior to house 130, such as walls, furniture, persons, etc. Broadcast signal 120 also radiates to mobile device 170. Mobile device 170 may be a vehicle with a television receiver in it, or a person with a mobile media player or smart phone, or any receiver which is in motion relative to transmitter station 110. Because of this relative motion, broadcast signal 120 which reaches mobile device 170 undergoes a Doppler shift, which is tracked by the receiver in mobile device 170. This Doppler shift can be significant, and its statistics dynamic.

FIG. 2 shows a typical prior art DTV receiver system 200. Input signal 210 can come from an antenna, cable, computer drive, etc. In the case of the prior art digital television broadcast communication system depicted in FIG. 1, input signal 210 is comprised of broadcast DTV signal 120 and multipath signals 160. Input signal 210 is coupled to Tuner and Analog Front End module 220. Tuner and Analog Front End module 220 may be implemented as discrete components, silicon dice, or a combination. Tuner and Analog Front End module 220 tunes to the proper broadcast channel, performs level setting and filtering, digitizes the analog signal, and supplies the bit stream to Demodulator 230 via bi-directional connection 255. Demodulator 230 is usually implemented in silicon, and performs a multiplicity of tasks to recover the encoded DTV data, including frequency translation, filtering, symbol timing, carrier frequency synchronization, equalization, and forward error correction. Demodulator 230 recovers the data bits encoded into DTV Signal 120, and is coupled to Media Processor 240 via connection 265. Media Processor 240, among other functions, interprets the data bits from demodulator 230 and renders the multimedia content for display, indicated by output signal 250. Media Processor 240 is usually implemented on the same silicon as demodulator 240, but not always.

FIG. 3 shows a typical prior art demodulator 230, introduced in FIG. 2. Demodulator 230 is applicable to DTV signals using single-carrier or multi-carrier modulation techniques. Bi-directional connection 255 from FIG. 2 is comprised of input signal 370 and output signal 360 in FIG. 3. Input signal 370 comes from Tuner and Analog Front End module 220 and is coupled to Front End Circuitry 320. Front end circuitry 320 receives input signal 370 and performs a variety of tasks needed for band pass signal isolation, for example, automatic gain control, quadrature demodulation, carrier and timing synchronization, and pilot tracking, as needed. See H. Meyr, M. Moeneclaey, and S. A. Fechtel, *Digital Communication Receivers*, New York, N.Y.: John Wiley and Sons, 1998, for a description of front-end circuitry methods used for band pass signal isolation. Output signal 360 from Front End Circuitry 320 contains control signals for conditioning of the analog input signal prior to digitization, for example, level setting and/or frequency control, derived in Front End Circuitry 320 from the data signal, and coupled to Tuner and Analog Front End module 220. Front End Circuitry 320 also receives control signal 380 from Equalizer 330, shown in phantom, since it is not used in many applications. Control signal 380 may contain synchronization adjustments derived in equalizer 330, based on a variety of known methods. For example, Y. Mostofi and D.C. Cox, "A Robust Timing Synchronization Design in OFDM Systems—Part II: High-Mobility Cases," *IEEE Transactions on Wireless Communications*, vol. 6, no. 12, pp. 4340-4348, December 2007, derives timing adjustments from pilot tones, while K. H. Mueller and M. Muller, "Timing Recovery in Digital Synchronous Data Receivers," *IEEE Transactions on Communications*, vol. COM-24, no. 5, pp. 516-531, May 1976, uses symbol estimates themselves to derive a timing control signal, and it is typical in OFDM systems to use correlation against training data to derive a timing control signal. Front end circuitry 320 is coupled to Equalizer 330 via output baseband signal 390.

Equalizer 330 receives baseband signal 390 and removes distortions from it. Such distortions may be the result of inter-symbol interference as modeled in multipath signals 160, noise processes introduced in Tuner and Analog Front End 220 or Front End Circuitry 320, adjacent channel interference into broadcast signal 120 and hence coupled into antenna 150, and inaccuracies in transmitter 110, among other processes which distort the desired, encoded signal itself, or its statistics. Equalizer 330 may use a variety of architectures and algorithms, and direct or indirect equalization methods—see S. U. H. Qureshi, "Adaptive Equalization," *Proceedings of the IEEE*, vol. 73, no. 9, pp. 1349-1387, September, 1985 for a survey of equalization approaches. Direct methods solve for an equalizer setting derived from the data itself, while indirect equalization methods rely on a channel estimate to set the equalizer parameterization. Both direct and indirect equalizers are applicable to both single-carrier and multi-carrier signals. Hence, equalizer 330 receives input signal 385 from Channel Identification (CID) block 365. Input signal 385 contains a channel estimate, which can be used in equalizer 330 when indirect equalization methods are employed. Equalizer 330 produces control signal 380, shown in phantom. Control signal 380 may contain timing or carrier adjustments, for example, based on a variety of known methods, using pilot tones or symbol estimates. The equalized signal 395 has distortions removed, limited by the ability of equalizer 330, and is coupled to Forward Error Correction (FEC) block 340.

FEC 340 further removes distortions of the equalized signal 395 by exploiting the channel coding done to the data signal prior to broadcast. FEC 340 typically tries to minimize the BER of the output signal 265. See S. H. Lin and D. J. Costello, Jr., *Error Control Coding: Fundamentals and Applications*, Upper Saddle River, N.J.: Prentice Hall, 2004 for discussions of error correction techniques applicable to DTV signals. Output signal 265 from FEC 340 is coupled to media processor 240.

FIG. 4 depicts Demodulator 400. Front End Circuitry 470 contains modifications, compared to Front End Circuitry 320 in FIG. 3. Similarly, CID 495 contains modifications, compared to CID 365 in FIG. 3. Variable Delay Buffer (VDB) 410 is between Front end Circuitry 470 and Equalizer 330 in the main data path. Equalizer 330 and FEC 340 are not modified.

In FIG. 4, Front End Circuitry 470 receives input signal 370 from Tuner and Analog Front End 220, and control signal 420 from CID 495. Front End Circuitry 470 performs the needed tasks for band pass signal isolation, just as in Front End Circuitry 320, but Front End Circuitry 470 contains modified timing recovery circuitry (to be discussed in FIG. 6) which accepts control signal 420. Front end circuitry 470 is coupled to VDB 410 via baseband signal 390. VDB 410 is a variable delay buffer (to be discussed in FIG. 7), which adjust its read and write pointers in accordance to control signal 430 from CID 495.

CID 495 receives equalizer input signal 460 and provides a channel estimate to equalizer 330 via connection 385. However, CID 495 also produces control signal 430 to VDB 410, and control signal 420 to Front End Circuitry 470. Control signals 420 and 430 are used to coherently adjust delay in the main data path and timing recovery interpolation rate, so as to cause a consistent number of samples in each frame of data to the FEC 340, according to the DTV signal protocol. In the prior art demodulator in FIG. 3, a cycle slip in timing recovery or dynamic multipath can induce an incorrect number of samples in the framing structure expected by FEC 340, causing a catastrophic FEC failure. By directly placing the CID 495 in a larger synchronization loop, consisting of CID 495, Front End Circuitry 470, and VDB 410, instead of outside the synchronization loop as done in the prior art, the currently described system forces the alignment of the data with the frequency of the resampling in the timing recovery so that the number of samples within a FEC frame is correct, preventing a catastrophic FEC failure.

Moreover, the currently described system uses the CID 495 directly to derive control signals to adjust synchronization parameters. In prior art techniques for OFDM signals, correlation techniques against training data are used to provide synchronization updates. The currently described system does not require correlation against training data, as in the prior art, but rather relies only on obtaining a channel estimate, which can be done by a variety of methods, without training data. (See FIG. 8 and its surrounding discussion.) Note that it would be obvious to one skilled in the art how to move the relative position of VDB 410 within demodulator 400 to suit a particular implementation.

FIG. 5 shows a prior art Timing Recovery Loop 500. Such a timing recovery loop or a similar resampling circuit is used in Front End Circuitry 320. The purpose of Timing Recovery Loop 500 is to resample the data from $F_{in}$ to $F_{out}$, ($F_{in}>F_{out}$) where $F_{in}$ is the sampling rate of the input data, and $F_{out}$ is the sampling rate of the output data. Usually, the input sampling rate $F_{in}$ is a fraction of the ADC sampling rate, and the output sampling rate $F_{out}$ is a multiple of the symbol frequency, or baud. See L. E. Franks, "Carrier and Bit Synchronization in Data Communication—A Tutorial Review," *IEEE Transactions on Communications*, vol. COM-28, no. 8, pp 1107-1121, August 1980, for a survey of applicable timing recovery methods.

Input signal 505 is provided to Interpolator 510. Interpolator 510 is a polyphase filter bank, selecting a filter from among a plurality of filters according to filtered error signal 550 from Loop Filter 520. Based on the desired output frequency, Interpolator 510 applies the selected filter to its input data at a rate to on average reduce the sample rate of its output. See L. Erup, F. M. Gardner, and R. A. Harris, "Interpolation in Digital Modems—Part II: Implementation and Performance," *IEEE Transactions on Communications*, vol. 41, no. 6, pp. 998-1008, June, 1993, for a description of polyphase interpolation used for timing recovery. The resampled data at $F_{out}$ 590 is simultaneously provided to subsequent circuitry, as output of timing recovery loop 500, and also to Phase Detector 530.

To the extent that the resampled data 590 is different in frequency and phase from a desired frequency and phase, Phase Detector 530 generates an error signal 560. See D. N. Godard, "Passband Timing Recovery in an All-Digital Modem Receiver," *IEEE Transactions on Communications*, vol. COM-26, no. 5, pp. 517-523, May 1978, for description of phase detection methods for timing recovery which are applicable without precise carrier lock. Error signal 560 is provided to Loop Filter 520. Loop Filter 520 filters error signal 560 to produce filtered error signal 550. To lock in phase and frequency, the loop filter usually applies proportional and integral control with settable loop gains.

FIG. 6 shows a Timing Recovery Loop 600. Compared to the prior art timing recovery loop 500, Timing Recovery Loop 600 adds demultiplexer 620; other functions within Timing Recovery Loop 600 operate like the prior art.

Demultiplexor 620 selects between filtered error signal 550 and control signal 420 from CID 495, responsive to selection signal 610, and provides the selected signal as output signal 630 to Interpolator 510. When control signal 420 is selected, Timing Recovery Loop 600 is broken, or opened, and the larger synchronization loop consisting of CID 495, Front End Circuitry 470, and VDB 410, is used to adjust the frequency of the resampled data from Interpolator 510 and simultaneously the delay in the main data path, via pointers in VDB 410, to guarantee that the number of samples in the protocol's framing structure is correct, as expected by FEC 340. Selection signal 610 can be automatically set by monitoring the cursor position in CID 495, or set via a programmable register, for example.

FIG. 7 illustrates Variable Delay Buffer (VDB) 700. Buffer 710 can be implemented with any type of data buffer, for example FIFO or circular. At each sample instance, Buffer 710 writes data input 390 to the position in the buffer 710 designated by Write Pointer (n) 720, reads data output 460 from the position in the buffer 710 designated by Read Pointer (n) 430 (control signal from CID 495), and data progresses in buffer 710 from Write Pointer (n) 720 to Read Pointer (n) 430.

The pointers Read Pointer (n) 430 and Write Pointer (n) 720 are subscripted by "n" to denote that these values can change over time. Moreover, the positions of the pointers can move both forwards and backwards in time (relative to the data flow). When going back in time, the effect of VDB 700 is to repeat samples in the data stream; when going forward in time, the effect of VDB 700 is to skip samples in the data stream. Usually, Write Pointer (n) 720 is fixed and Read Pointer (n) 430 is adjusted, but alternatively, Read Pointer (n) 430 could remain fixed while Write Pointer (n) 720 is adjusted.

FIG. 8 illustrates a Channel Identification (CID) 495. Output samples 460 from VDB 700 are input to Channel Estimator 810. Channel Estimator 810 produces a channel estimate by known, prior art methods. For example, H. Vikalo, B. Hassibi, B. Hochwald, and T. Kailath, "Optimal Training for Frequency-Selective Fading Channels," *Proceedings of the International Conference on Acoustics, Speech, and Signal Processing*, Salt Lake City, Utah, May, 2001 illustrates how to produce a channel estimate using training data, and how to design the training data, while L. Tong, G. Xu, B. Hassibi, and T. Kailath, "Blind Channel Identification Based on Second Order Statistics: A Frequency-Domain Approach," *IEEE Transactions on Information Theory*, vol. 41, pp. 329-224, January 1995, shows how to produce a channel estimate blindly (without training data) by exploiting statistical properties of the data. In general, the literature is replete with channel identification methods; see L. Tong and S. Perreau, "Multichannel Blind Identification: From Subspace to Maximum Likelihood Methods," *Proceedings of the IEEE*, vol. 86, no. 10, pp. 1951-1968, October 1998, for a survey of applicable channel identification methods. Channel Estimator 810 produces channel estimate 850, coupled to Cursor Extraction 820.

Cursor Extraction 820 finds the position in the channel estimate with the largest coefficient magnitude. For example, an $L_1$ or $L_2$ noun can be used, among other measures. Cursor Extraction 820 finds the position in the channel estimate with the largest coefficient magnitude in connection 840 (cursor position), and supplies it to Cursor Processing 830.

Cursor Processing 830 receives cursor position 840 from Cursor Extraction 820, and time count 860 from Time Keeper 495. Cursor Processing 830 tracks cursor position 840, and according to a rule, sets control signals 420 and 430, and reset signal 870 back to Time Keeper 495. The rule could be any measure against the cursor position 840. For example, if cursor position 840 moves more than a prescribed threshold, this distance Δ can be used to set the control signals and reset. In this example, control signal 430 to VDB is a position, determined directly from distance Δ. Distance Δ can be added to the existing value of control signal 430, to update Read Pointer (n) in FIG. 7. Control signal 420 is a frequency used to adjust the resample rate in Timing Recovery Loop 600, and is derived by normalizing distance Δ by time count 860 from Time Keeper 495. The normalized distance can be used to adjust control signal 420 similarly to the adjustment of control signal 430, namely by adding the normalized distance to control signal 420. When control signals 420 and 430 are set by Cursor Processing 830, Cursor Processing 830 also sets reset signal 870, provided to Time Keeper 495.

Time Keeper 495 receives output samples 460 from VDB 700 and provides a running count of these input samples in the signal time count 860 to Cursor Processing 830. When Time Keeper 495 receives reset signal 870 from Cursor Processing 830, the running count of input samples in Time Keeper 495 is reset to zero.

One skilled in the art would understand that the various functions of signal processing described herein may include scaling, change of sign, or similar constant modifications that are not shown or discussed for simplicity. One skilled in the art would realize that such modifications can be readily determined or derived for the particular implementation. Thus, the described various functions of signal processing may be subject to such modifications, and are not limited to the exact forms or descriptions presented herein.

As would be apparent to one skilled in the art, the various functions of signal processing may be implemented with circuit elements or may also be implemented in the digital domain as processing steps in a software program. Such software may be employed in, for example, a digital signal processor, micro-controller, or general-purpose computer.

The current application is directed to both methods and apparatuses for practicing those methods, as well as to program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of the currently claimed invention may be made by those skilled in the art without departing from the principle and scope of the invention as expressed in the following claims.

What is claimed is:

1. A method performed by a device capable of receiving a signal and producing a channel estimate comprising:
   placing samples comprised of a processed version of the signal in a buffer; and
   using the channel estimate to read or write the samples from the buffer and place in a frame of data;
   wherein the channel estimate is used to adjust a number of samples in the frame of data and a sample phase of the signal.

2. A method in accordance with claim 1, wherein a cursor delay is derived from the channel estimate, and the cursor delay is used to adjust a read or write position of the samples from or into the buffer.

3. An apparatus comprising:
   a channel estimator coupled to a signal and produces a channel estimate and an error signal;
   a resampler coupled to the signal and to the error signal, and produces re-sampled data; and
   a buffer coupled to the re-sampled data and the channel estimate, which places the re-sampled data and adjust a number of samples in a frame of data responsive to the channel estimate.

4. An apparatus comprising:
   a channel estimator coupled to a signal and produces a channel estimate and an error signal;
   a resampler coupled to the signal and to the error signal, and produces re-sampled data; and
   a buffer coupled to the re-sampled data and the channel estimate, which places the re-sampled data in a frame of data responsive to the channel estimate to adjust a number of samples in the frame of data;
   wherein the channel estimator adjusts a sample phase of the signal.

5. An apparatus comprising:
   a channel estimator producing a channel estimate;
   a buffer coupled to a signal and the channel estimate, and containing buffer samples; and
   a buffer controller which reads or writes the buffer samples from the buffer into a frame of data responsive to the channel estimate to adjust a number of samples in the frame of data;
   wherein the channel estimator adjusts a sample phase of the signal.

* * * * *

UNITED STATES PATENT AND TRADEMARK OFFICE
CERTIFICATE OF CORRECTION

PATENT NO. : 8,724,759 B2  Page 1 of 1
APPLICATION NO. : 13/465971
DATED : May 13, 2014
INVENTOR(S) : Raul Alejandro Casas et al.

It is certified that error appears in the above-identified patent and that said Letters Patent is hereby corrected as shown below:

On the Title Page, item (73), delete the words "I Berium Communications, Inc." and insert the words --Iberium Communications, Inc.--.

Signed and Sealed this
Eighth Day of July, 2014

Michelle K. Lee
*Deputy Director of the United States Patent and Trademark Office*